(12) United States Patent
Arafat et al.

(10) Patent No.: US 7,931,233 B2
(45) Date of Patent: Apr. 26, 2011

(54) PROTECTIVE SKIN FOR AIRCRAFT

(75) Inventors: Husam R. Arafat, Keller, TX (US); Aldo Villa, Gallarate, VA (US)

(73) Assignee: Textron Innovations Inc., Providence, RI (US)

( * ) Notice: Subject to any disclaimer, the term of this patent is extended or adjusted under 35 U.S.C. 154(b) by 78 days.

(21) Appl. No.: 10/568,171

(22) PCT Filed: Aug. 27, 2003

(86) PCT No.: PCT/US03/26876
§ 371 (c)(1),
(2), (4) Date: Nov. 13, 2006

(87) PCT Pub. No.: WO2005/030577
PCT Pub. Date: Apr. 7, 2005

(65) Prior Publication Data
US 2007/0138340 A1    Jun. 21, 2007

(51) Int. Cl.
*B64C 1/00* (2006.01)
(52) U.S. Cl. .................. 244/123.1; 244/124
(58) Field of Classification Search .............. 244/123.1, 244/123.14, 123.7, 123.4, 91, 87, 119, 123.8, 244/124
See application file for complete search history.

(56) References Cited

U.S. PATENT DOCUMENTS

| | | | | |
|---|---|---|---|---|
| 1,866,680 A | * | 7/1932 | Stout | 244/13 |
| 1,988,085 A | * | 1/1935 | Orlando | 244/131 |
| 2,371,754 A | * | 3/1945 | Gillum et al. | 428/594 |
| 2,427,065 A | * | 9/1947 | Nebesar | 244/123.8 |
| 2,615,234 A | * | 10/1952 | Dumbleton | 29/462 |
| 2,639,876 A | | 5/1953 | Misfeldt | |
| 2,739,047 A | * | 3/1956 | Sanz | 428/598 |
| 3,135,486 A | * | 6/1964 | Wing | 244/123.8 |
| 4,113,549 A | * | 9/1978 | Brimm | 216/46 |
| 4,667,906 A | * | 5/1987 | Suarez et al. | 244/124 |
| 4,976,396 A | * | 12/1990 | Carlson et al. | 244/55 |
| 5,213,287 A | * | 5/1993 | Barron | 244/130 |
| 5,626,462 A | * | 5/1997 | Jackson et al. | 416/97 R |
| 6,237,873 B1 | * | 5/2001 | Amaoka et al. | 244/123.7 |
| 2001/0015043 A1 | | 8/2001 | Brenneis et al. | |
| 2002/0011540 A1 | * | 1/2002 | De Castro Nodal et al. | 244/45 R |

OTHER PUBLICATIONS

Isogrid Design Handbook. NASA Contractor Report CR-124075. Feb. 1973.*
Chinese Office Action for Chinese Patent Application No. 038269740 and partial English translation thereof.
Supplementary European Search Report from corresponding European Application No. 03818807.4, dated Sep. 23, 2010.

* cited by examiner

*Primary Examiner* — Tien Dinh
*Assistant Examiner* — Michael Kreiner
(74) *Attorney, Agent, or Firm* — James E. Walton

(57) ABSTRACT

A protective skin (143*a*, 143*b*) for an aircraft is disclosed. The protective skin (143*a*, 143*b*) forms the leading edges of wing members, horizontal stabilizers, and vertical fins. A portion of the skin material (143*a*, 143*b*) is removed in a selected pattern (155*a*, 157*a*, 159*a*, 161*a*, 155*b*, 157*b*, 159*b*, 161*b*) from the interior surface of the skin (143*a*, 143*b*). In the preferred embodiment, the interior surface of the skin is chemically etched and/or mechanically milled in oval and rectangular patterns so as to create crumple zones (155*a*, 157*a*, 159*a*, 161*a*, 155*b*, 157*b*, 159*b*, 161*b*) and generate progressive failure of the metal. This allows the leading edge to absorb the impact energy from a collision with a bird or other object, and prevent the bird or other object from penetrating through the leading edge into the substructure.

18 Claims, 3 Drawing Sheets

PROTECTIVE SKIN FOR AIRCRAFT

TECHNICAL FIELD

The present invention relates to skins for aircraft. In particular, the present invention relates to skins for protecting aircraft from impact damage.

DESCRIPTION OF THE PRIOR ART

Modern aircraft are manufactured from a wide variety materials, including steel, aluminum, and a wide variety of composite materials. Most of the structural components are made from strong, rigid materials. However, in order to conserve weight, the skin of the aircraft is often made from a thin sheet of metal or composite. Because these skins are so thin, leading edges of wings and stabilizers are usually reinforced with protective layers or strips of material.

Even with protective layers and strips of reinforcing material, the leading edges of wings and stabilizers are susceptible to impact damage from flying objects and birds. For example, when a bird impacts the leading edge of an aircraft wing or vertical stabilizer, it can pass completely through the skin and protective layers to the interior substructure of ribs, spars, and control components. Such damage to the leading edge and substructure can lead to catastrophic failure of the aircraft. If the aircraft can be safely landed, the only way to repair the damage is to completely replace the wing or stabilizer. Complete replacement of wings and stabilizers is very time consuming and costly.

The only way to protect against critical damage to the substructure is to add additional components and extra substructure. This is very costly and adds extra weight to the aircraft. In many cases, space constraints prevent the addition of adequate protection from such impact damage.

SUMMARY OF THE INVENTION

There is a need for a protective skin for an aircraft that can absorb the impact of and minimize the damage from collisions with flying objects and birds.

Therefore, it is an object of the present invention to provide a protective skin for an aircraft that can absorb the impact of and minimize the damage from collisions with flying objects and birds.

This object is achieved by providing a protective skin for the leading edges of wing members, horizontal stabilizers, and vertical fins in which a portion of the skin material is removed in a selected pattern from the interior surface of the skin. In the preferred embodiment, the interior surface of the skin is chemically etched in oval and rectangular patterns so as to create crumple zones and generate progressive failure of the metal. This allows the leading edge to absorb the impact energy from a collision with a bird or other object, and prevent the bird or other object from penetrating through the leading edge into the substructure. In applications in which the radius of curvature of the leading edge is relatively large, or where there is adequate space, an I-beam shaped stiffener may be added behind the skin to provide additional stiffness.

The present invention provides significant advantages, including: (1) impacts from birds and other objects can be absorbed without affecting the substructure of the aircraft; (2) penetration of the leading edge by a bird or other object can be eliminated or significantly reduced; (3) the leading edge can be normally stiffened without any weight increase; and (4) the failure response of the leading edge can be locally tuned by selectively shaping, sizing, and orienting the pockets on the interior surface of the skin.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DESCRIPTION OF THE PREFERRED EMBODIMENT

The present invention involves a method and apparatus for protecting the substructure of an aircraft from damage due to leading edges impact with flying objects, such as birds. Although the present invention will be described with reference to a tiltrotor aircraft, it will be appreciated that the present invention may be used on any type of aircraft in which it is desirable to provide such protection.

Figure 1:
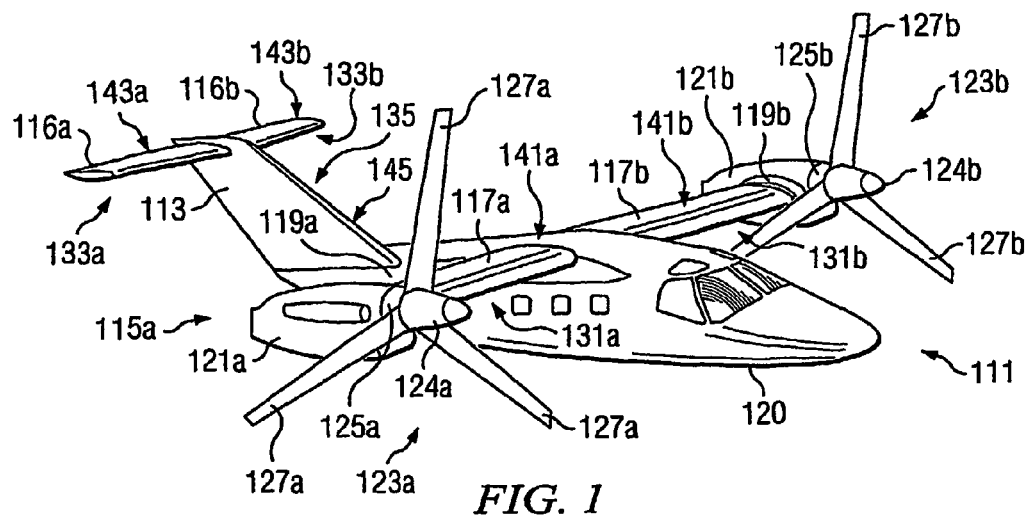
FIG. 1 is a perspective view of an aircraft having a protective skin according to the present invention.

Referring to FIG. 1 in the drawings, a tiltrotor aircraft 111 having a protective skin according to the present invention is illustrated. Tiltrotor aircraft are unique rotorcraft in that they have tiltrotor assemblies that operate between a helicopter mode in which the tiltrotor assemblies are rotated upward allowing the tiltrotor aircraft to take off, hover, fly, and land like a conventional helicopter; and an airplane mode, in which the tiltrotor assemblies are tilted forward allowing the tiltrotor aircraft to fly like a conventional fixed-wing propeller driven aircraft. The first tiltrotor aircraft were designed strictly for military purposes, but now efforts are being made to manufacture civilian-type tiltrotor aircraft, and "Quad" tiltrotor aircraft having two sets of wing assemblies and four tiltrotor nacelle assemblies. In FIG. 1, tiltrotor aircraft 111 is a civilian-type tiltrotor aircraft shown in the airplane mode.

Tiltrotor aircraft 111 includes a fuselage 120, one or more wing members 117a and 117b coupled to fuselage 120, at least one vertical tail fin 113 connected to fuselage 120, and one or more horizontal stabilizers 116a and 116b connected to vertical tail fin 113. A pair of nacelle assemblies 115a and 115b are carried by wing members 117a and 117b and are typically disposed at end portions 119a and 119b of wing members 117a and 117b, respectively. Tiltrotor nacelle assemblies 115a and 115b include nacelles 121a and 121b that house the engines, transmissions, and proprotor gearboxes that drive proprotors 123a and 123b. Proprotors 123a and 123b are disposed on the forward ends 125a and 125b of nacelles 121a and 121b, and include hubs 124a and 124b and proprotor blades 127a and 127b, respectively. As is conventional with tiltrotor aircraft, proprotors 123a and 123b counter-rotate relative to each other, i.e., proprotor 123a rotates counterclockwise and proprotor 123b rotates clockwise if viewed looking in the aft direction while tiltrotor aircraft 111 is in the airplane mode.

Tiltrotor nacelle assemblies 115a and 115b rotate relative to wing members 117a and 117b between the helicopter mode in which tiltrotor nacelle assemblies 115a and 115b are tilted upward, such that tiltrotor aircraft 111 can take off, hover, fly, and land like a conventional helicopter; and the airplane mode in which tiltrotor nacelle assemblies 115a and 115b are tilted forward, such that tiltrotor aircraft 111 flies like a conventional fixed-wing propeller driven aircraft.

Wing members 117a and 117b have leading edges 131a and 131b; horizontal stabilizers 116a and 116b have leading edges 133a and 133b; and vertical tail fin 113 has a leading edge 135. According to the present invention, leading edges 131a and 131b are formed from impact skins 141a and 141b, respectively; leading edges 133a and 133b are formed from impact skins 143a and 143b, respectively; and leading edge 135 is formed from an impact skin 145. Impact skins 141a, 141b, 143a, 143b, and 145 are preferably manufactured from a metallic material and are configured to provide protection against bird strikes and impacts by other objects during the operation of tiltrotor aircraft 111.

Figure 2:
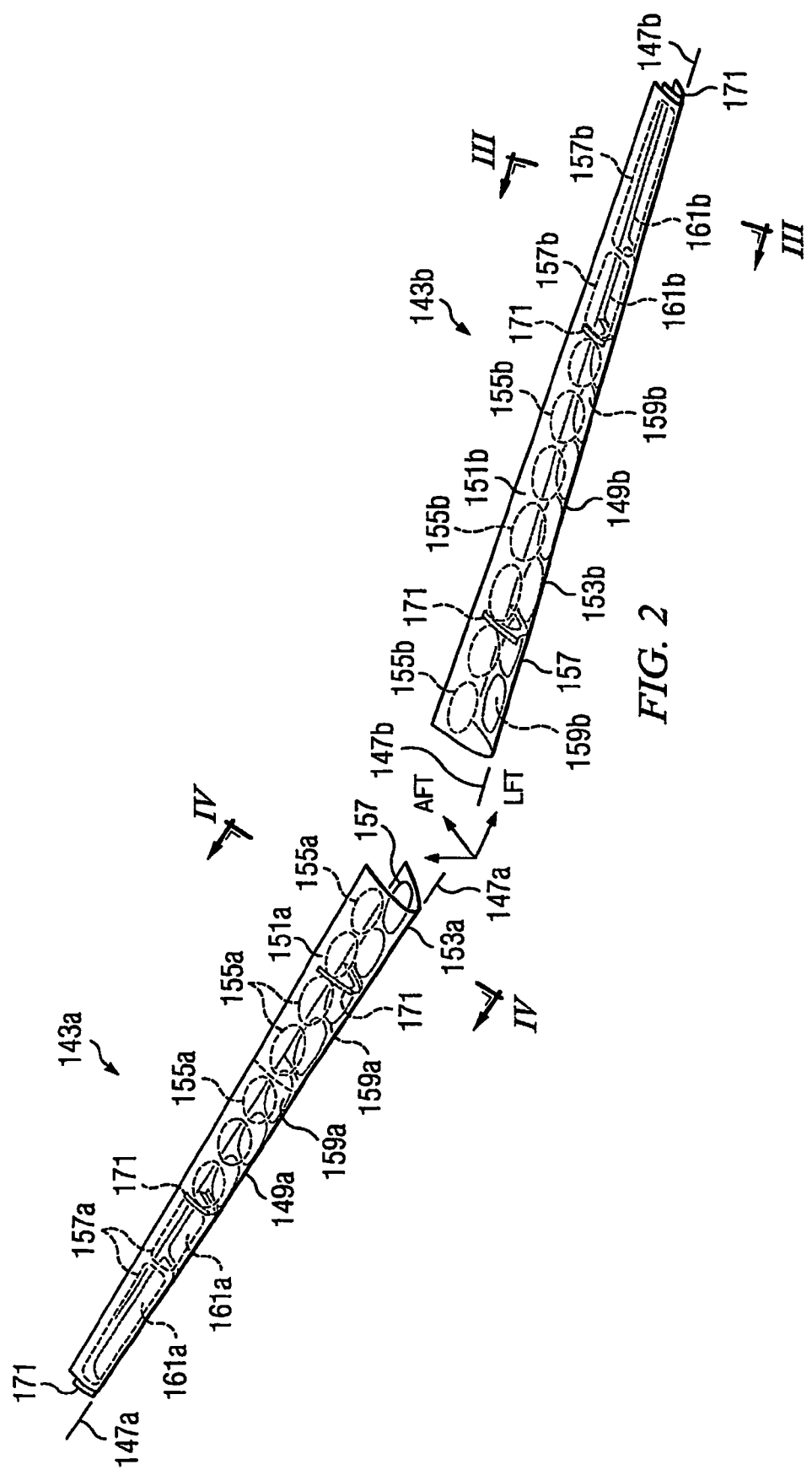
FIG. 2 is a schematic of the skin forming the leading edges of the horizontal stabilizers of the aircraft of FIG. 1.

Referring now to FIG. 2 in the drawings, impact skins 143a and 143b are shown in a schematic perspective view. It will be appreciated that the following discussion with respect to impact skins 143a and 143b applies to impact skins 141a, 141b, and 145 as well.

Impact skin 143a forms a curved airfoil surface that is symmetrical about a waterline axis 147a, such that impact surface 143a has an upper airfoil surface 151a and a lower airfoil surface 153a. Likewise, impact surface 143b forms a curved airfoil surface that is symmetrical about a waterline axis 147b, such that impact surface 143b has an upper airfoil surface 151b and a lower airfoil surface 153b.

In accordance with the present invention, a plurality of recessed pockets 155a and 157a are formed in the interior portion of upper airfoil surface 151a, and a plurality of recessed pockets 159a and 161a are formed in the interior portion of lower airfoil surface 153a. In a similar fashion, a plurality of recessed pockets 155b and 157b are formed in the interior portion of upper airfoil surface 151b, and a plurality of recessed pockets 159b and 161b are formed in the interior portion of lower airfoil surface 153b. Recessed pockets 155a, 157a, 159a, 161a, 155b, 157b, 159b, and 161b are selectively sized, shaped, recessed, arranged, and contoured to create crumple zones and generate progressive failure of impact surfaces 143a and 143b. In the preferred embodiment, recessed pockets 155a, 157a, 159a, 161a, 155b, 157b, 159b, and 161b create alternating strong and soft regions in impact surfaces 143a and 143b. This allows impact surfaces 143a and 143b to absorb the impact energy from a collision with a bird or other object, and prevent the bird or other object from penetrating through impact surfaces 143a and 143b into the substructure of tiltrotor aircraft 111.

It should be understood that the size, shape, depth, arrangement, and contour of recessed pockets 155a, 157a, 159a, 161a, 155b, 157b, 159b, and 161b, may be selectively altered to produce different impact and crumple characteristics. In the preferred embodiment, recessed pockets 155a and 159a, which are generally located in inboard positions, have oval and circular shapes; and recessed pockets 157a and 159a, which are generally located in outboard positions, have rectangular shapes. It will be appreciated that in some applications it may be desirable to form fewer pockets or join the pockets together to form longer shapes and patterns. For example, one or more elongated pockets extending in the directions of waterline axes 147a and 147b in sinusoidal shapes may be used.

In the preferred embodiment, impact skins 143a and 143b are made of a metallic material, such as aluminum, and recessed pockets 155a, 157a, 159a, 161a, 155b, 157b, 159b, and 161b are chemically etched and/or mechanically milled into the interior portions of upper and lower airfoil surfaces 151a, 151b, 153a, and 153b. Due to the sharp curvature along station axes 147a and 147b, impact skins 143a and 143b are sufficiently stiff for normal operation and do not require additional stiffeners.

Impact skins 143a and 143b preferably include one or more local ribs 171 to facilitate attachment to the substructure of horizontal stabilizers 116a and 116b. Local ribs 171 are preferably attached to the substructure of horizontal stabilizers 116a and 116b by rivets or other suitable means, and support and maintain the shape of impact skins 143a and 143b.

Figure 3:
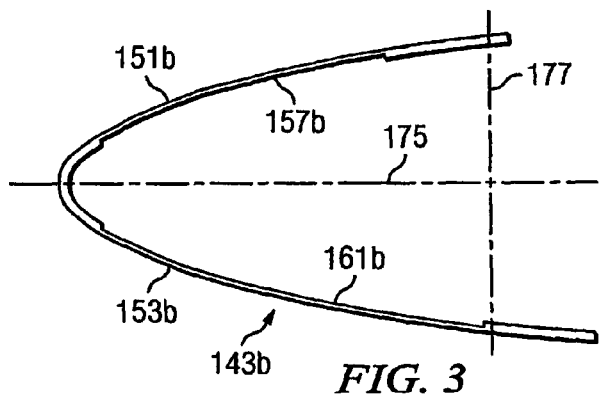
FIG. 3 is a cross-sectional view of the skin of FIG. 2 taken at III-III in FIG. 2.
Figure 4:
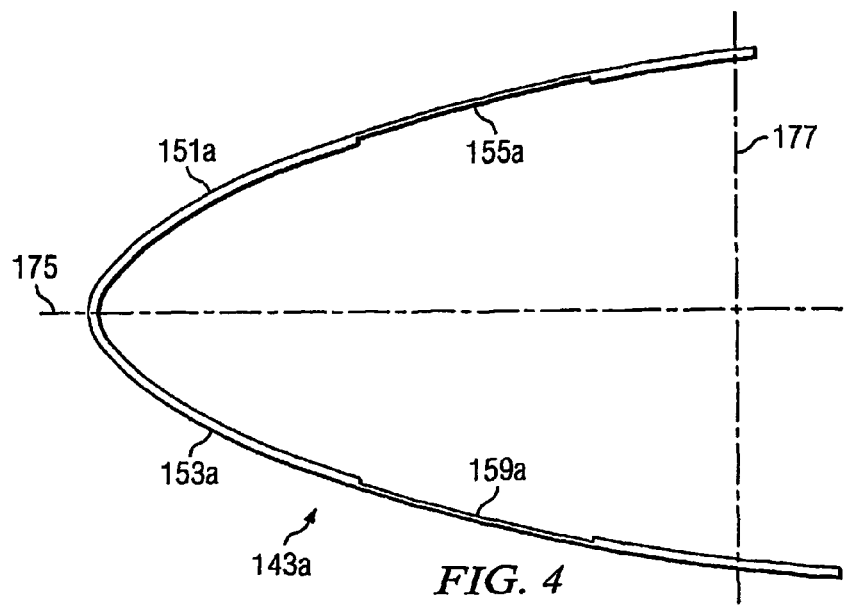
FIG. 4 is a cross-sectional view of the skin of FIG. 2 taken at IV-IV in FIG. 2.

Referring now to FIGS. 3 and 4 in the drawings, impact skins 143a and 143b are shown in cross-sectional views taken at III-III and IV-IV, respectively. Waterline axes 175 and forward outboard spar planes 177 of horizontal stabilizers 116a and 116b have been included to illustrate the preferred relative location and orientation of impact skins 143a and 143b. As is shown, in the preferred embodiment, about one half of the thickness of the upper and lower airfoil surfaces are removed by chemical etching and/or mechanically milled to form recessed pockets 155a, 159a, 157b, and 161b.

The size, shape, contour, and relative location of each pocket is selectively chosen depending upon the where the pocket is located along station axes 147a and 147b. For example, at inboard locations along horizontal stabilizers 116a and 116b where the radius of curvature of impact skin 143a is greater (see FIG. 4), pockets 155a and 159a may be located farther aft on upper and lower airfoil surfaces 151a and 153a; and at outboard locations where the radius of curvature of impact skin 143b is greater (see FIG. 3), pockets 157b and 161b may be located farther forward on upper and lower airfoil surfaces 151a and 153a.

Figures 5, 6:
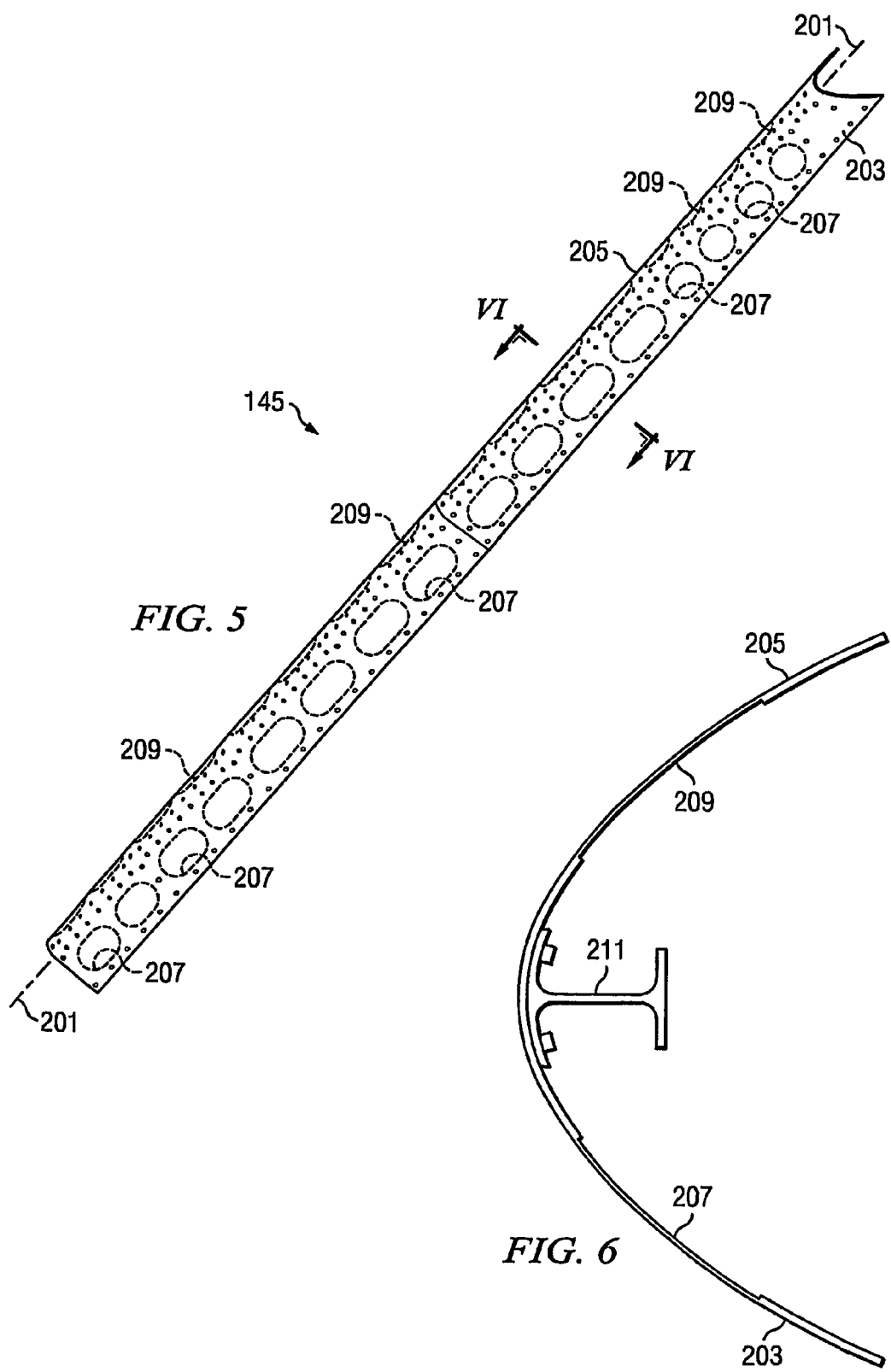
FIG. 5 is a schematic of the skin forming the leading edge of the vertical tail fin of the aircraft of FIG. 1.
FIG. 6 is a cross-sectional view of the skin of FIG. 5 taken at VI-VI in FIG. 5.

Referring now to FIGS. 5 and 6 in the drawings, impact skin 145 forming the leading edge of vertical tail fin 113 is illustrated. Impact skin 145 is symmetrical about a buttline axis 201, such that impact surface 145 has a right airfoil surface 203 and a left airfoil surface 205. In accordance with the present invention, a plurality of recessed pockets 207 are formed in the interior portion of right airfoil surface 203, and a plurality of recessed pockets 209 are formed in the interior portion of left airfoil surface 205. As with impact skins 143a and 143b, it is preferred that impact skin 145 be made of a metallic material, such as aluminum, and recessed pockets 207 and 209 be chemically etched and/or mechanically milled into the interior portions of right and left airfoil surfaces 203 and 205. In this manner, recessed pockets 207 and 209 perform the same functions as recessed pockets 155a, 157a, 159a, 161a, 155b, 157b, 159b, and 161b.

Impact skin 145 is similar in form and function to impact skins 143a and 143b and is preferably attached to the substructure of vertical tail fin 113 by rivets or other suitable means. However, due to the relatively large radius of curvature along buttline axis 201, and due to the availability of space within vertical tail fin 113, it is preferred that impact skin 145 include an additional stiffening means, such as an I-beam shaped stiffener 211 extending along a buttline axis 203 of vertical tail fin 113. Stiffener 211 is connected to the interior portion of impact skin 145 to provide additional stiffness and support to impact skin 145. It is not necessary that stiffener 211 be directly connected to the substructure of vertical tail fin 113.

Recessed pockets 207 and 209 are selectively sized, shaped, recessed, arranged, and contoured to create crumple zones and generate progressive failure of impact skin 145. Recessed pockets 207 and 209 create alternating strong and soft regions in impact skin 145. This allows impact skin 145 to absorb the impact energy from a collision with a bird or other object, and prevent the bird or other object from penetrating through impact skin 145 into the substructure of tiltrotor aircraft 111.

It should be understood that the size, shape, depth, arrangement, and contour of recessed pockets 207 and 209 may be selectively altered to produce different impact and crumple characteristics. For example, recessed pockets 207 and 209, which are generally located in higher positions, have circular shapes; and recessed pockets 207 and 209, which are generally located in lower positions, have oval shapes. It will be appreciated that in some applications it may be desirable to form fewer pockets or join the pockets together to form longer shapes and patterns. For example, one or more elongated pockets extending in the directions of buttline axis 201 in sinusoidal shapes may be used.

In operation, if a bird of other flying object collides with impact skin 145, pockets 207 and 209 deform outward and inward due to the reduced thickness of pockets 207 and 209, thereby absorbing the impact energy of the bird and preventing the bird from penetrating through impact skin 145 into the substructure of aircraft 111. This expansion-type deformation creates crumple zones and generates progressive failure of impact skin 145, thereby saving the substructure of aircraft 111.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A leading edge member for an aircraft, the aircraft having a substructure, at least a portion of the substructure being attached to a partial airfoil skin, the partial airfoil skin being a first airfoil member of an airfoil, the leading edge member comprising:
    an exterior surface and an opposing interior surface forming a surface thickness therebetween;
    a first set of pockets located in a first region approximate an inboard portion of the leading edge member;
    a second set of pockets located in a second region approximate an outboard portion of the leading edge member; and
    wherein each pocket is recessed into the interior surface of the leading edge member, each pocket defining a region of the leading edge member having a pocket thickness that is less than the surface thickness of the leading edge member, each pocket being configured to deform in response to an impact from an object with the leading edge member, each pocket being disposed solely within the leading edge member;
    wherein each pocket in the first set of pockets is at least one of an oval shape and a circular shape, the first set of pockets being configured to deform according to a first crumple characteristic;
    wherein each pocket in the second set of pockets has an approximately rectangular shape, the second set of pockets being configured to deform according to a second crumple characteristic, the second crumple characteristic being different from the first crumple characteristic;
    wherein the leading edge member is configured for attachment to the substructure, such that the exterior surface of the leading edge member forms a second airfoil member of the airfoil;
    wherein the second airfoil member is fixed in relation to the first airfoil member.

2. The leading edge member according to claim 1, wherein the leading edge member forms the leading edge of a wing member.

3. The leading edge member according to claim 1, wherein the leading edge member forms the leading edge of a horizontal stabilizer.

4. The leading edge member according to claim 1, wherein the leading edge member forms the leading edge of a vertical fin.

5. The leading edge member according to claim 1, wherein the pockets are formed by a chemical etching process.

6. The leading edge member according to claim 1, wherein the pockets are formed by a mechanical milling process.

7. The leading edge member according to claim 1, wherein the leading edge member is curved about a longitudinal axis so as to form an upper airfoil surface and a lower airfoil surface.

8. The leading edge member according to claim 7, wherein the first and second set of pockets are arranged in a selected pattern over the interior surfaces of the upper airfoil surface and the lower airfoil surface.

9. The leading edge member according to claim 8, wherein the pattern of pockets on the interior surface of the upper airfoil surface is a mirror image of the pattern of pockets on the interior surface of the lower airfoil surface.

10. The leading edge member according to claim 8, wherein the pattern of pockets on the interior surface of the upper airfoil surface is not a mirror image of the pattern of pockets on the interior surface of the lower airfoil surface.

11. The leading edge member according to claim 1, further comprising:
    at least one rib member connected to the interior surface of the leading edge member for attaching the leading edge member to the substructure.

12. The leading edge member according to claim 1, further comprising:
    a stiffening means connected to the interior surface of the leading edge member for providing localized stiffness to the leading edge member.

13. The leading edge member according to claim 12, wherein the stiffening means is an elongated I-shaped beam.

14. The leading edge member according to claim 12, wherein the stiffening means is not connected to the substructure.

15. The leading edge member according to claim 12, wherein the stiffening means is also connected to the substructure.

16. The leading edge member according to claim 1, wherein the leading edge member is attached to the substructure using at least one fastener.

17. The leading edge member according to claim 16, wherein the leading edge member is configured for detachment from the substructure by removing the at least one fastener.

18. The leading edge member according to claim 1, wherein the second member of the airfoil is upstream from the first member of the airfoil.

* * * * *